No. 887,632. PATENTED MAY 12, 1908.
T. S. HAYNES.
THRESHING MACHINE.
APPLICATION FILED APR. 25, 1906.
5 SHEETS—SHEET 2.
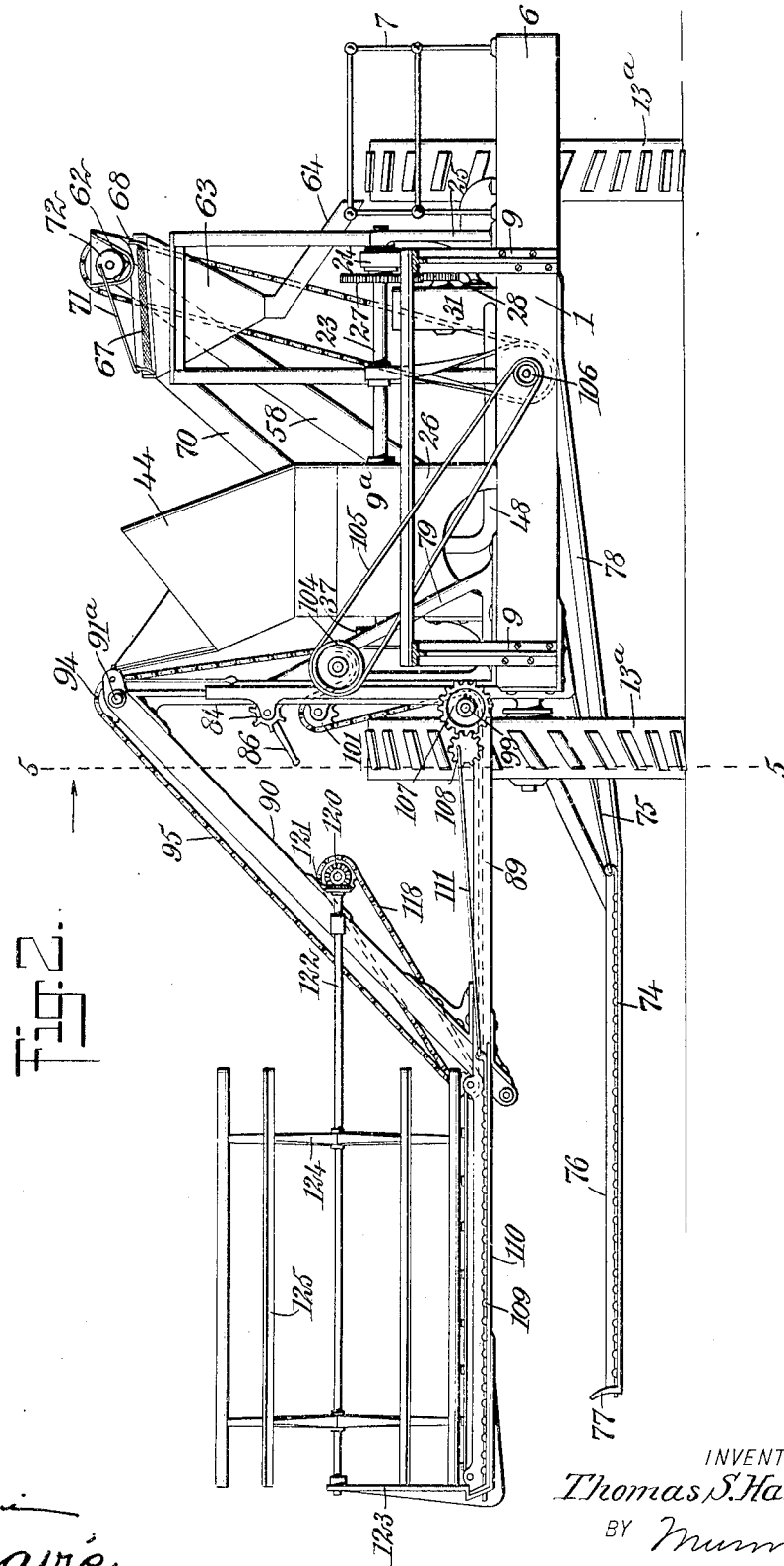
WITNESSES
INVENTOR
Thomas S. Haynes
BY Munn & Co
ATTORNEYS

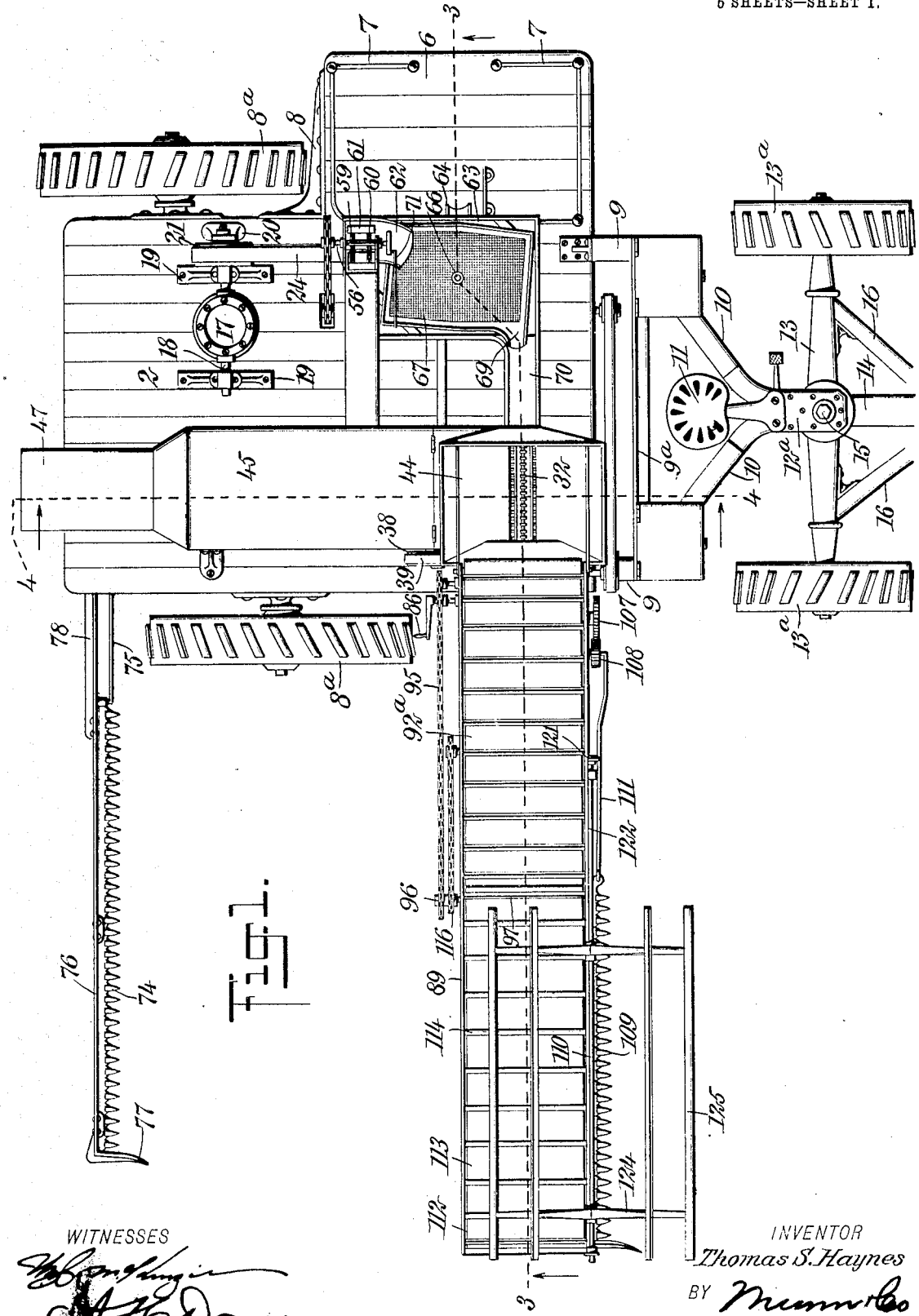

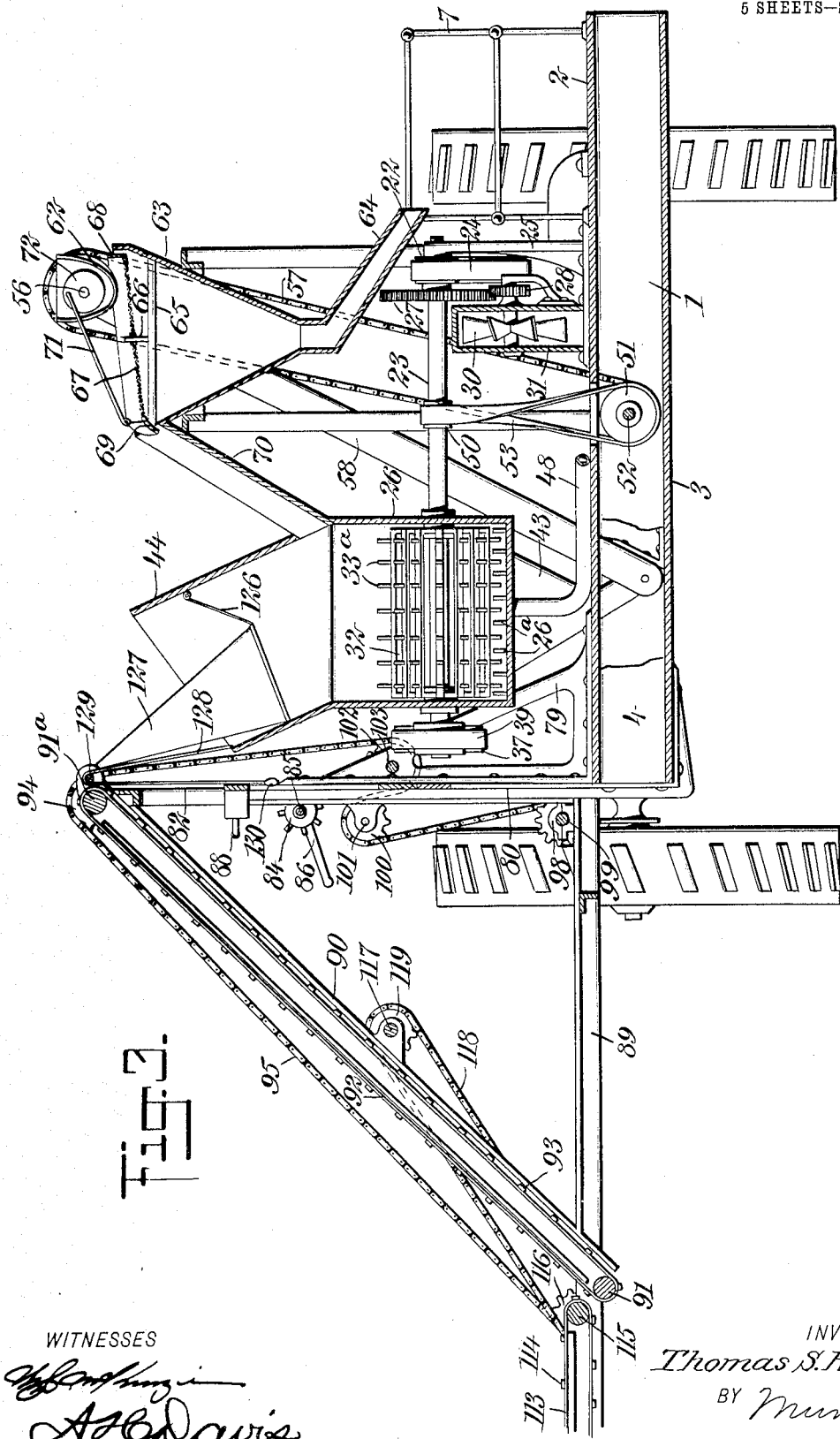

No. 887,632.
PATENTED MAY 12, 1908.
T. S. HAYNES.
THRESHING MACHINE.
APPLICATION FILED APR. 25, 1906.
5 SHEETS—SHEET 4.
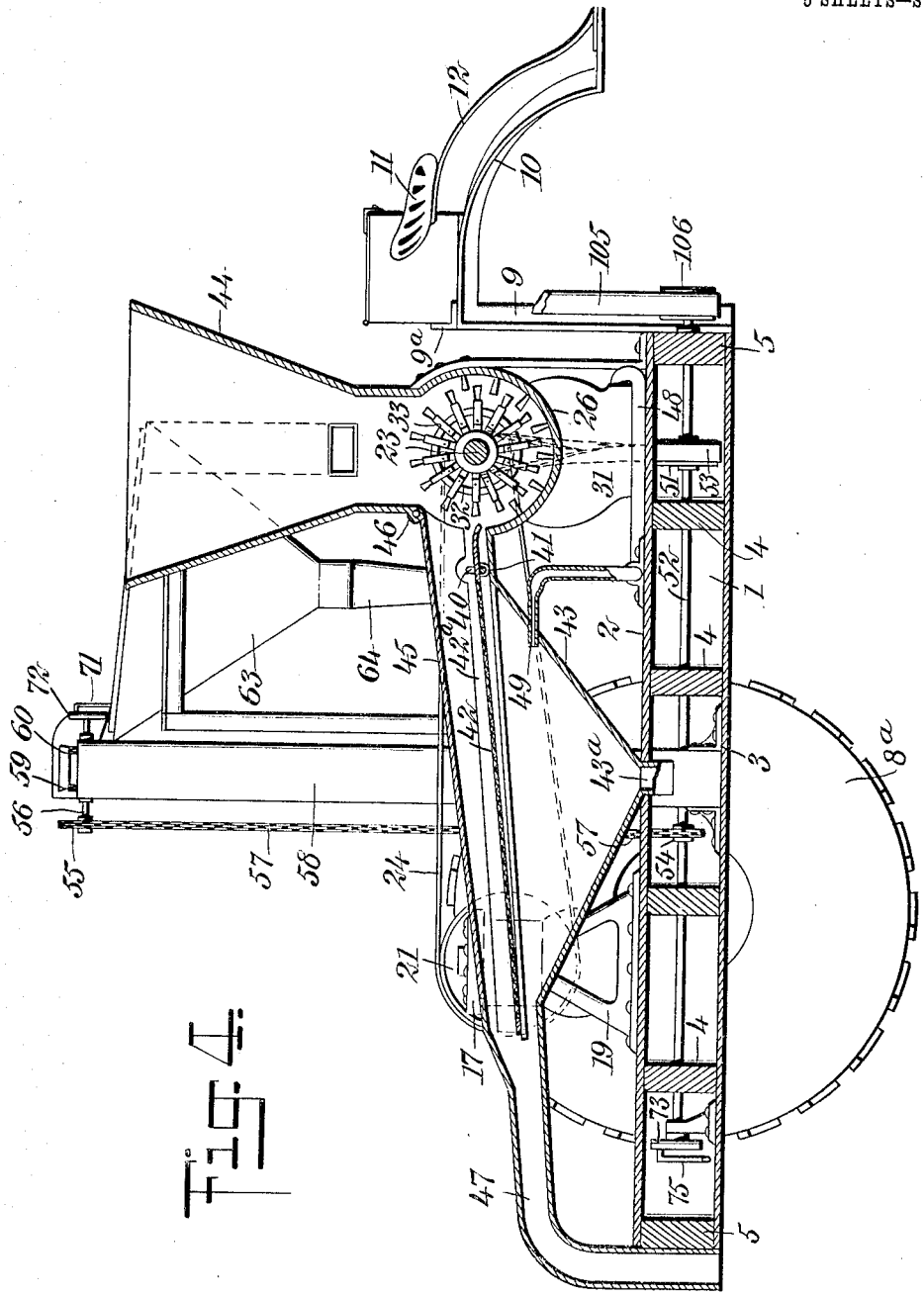
WITNESSES
INVENTOR
Thomas S. Haynes
BY Munn & Co
ATTORNEYS No. 887,632. PATENTED MAY 12, 1908.
T. S. HAYNES.
THRESHING MACHINE.
APPLICATION FILED APR. 25, 1906.
5 SHEETS—SHEET 5.
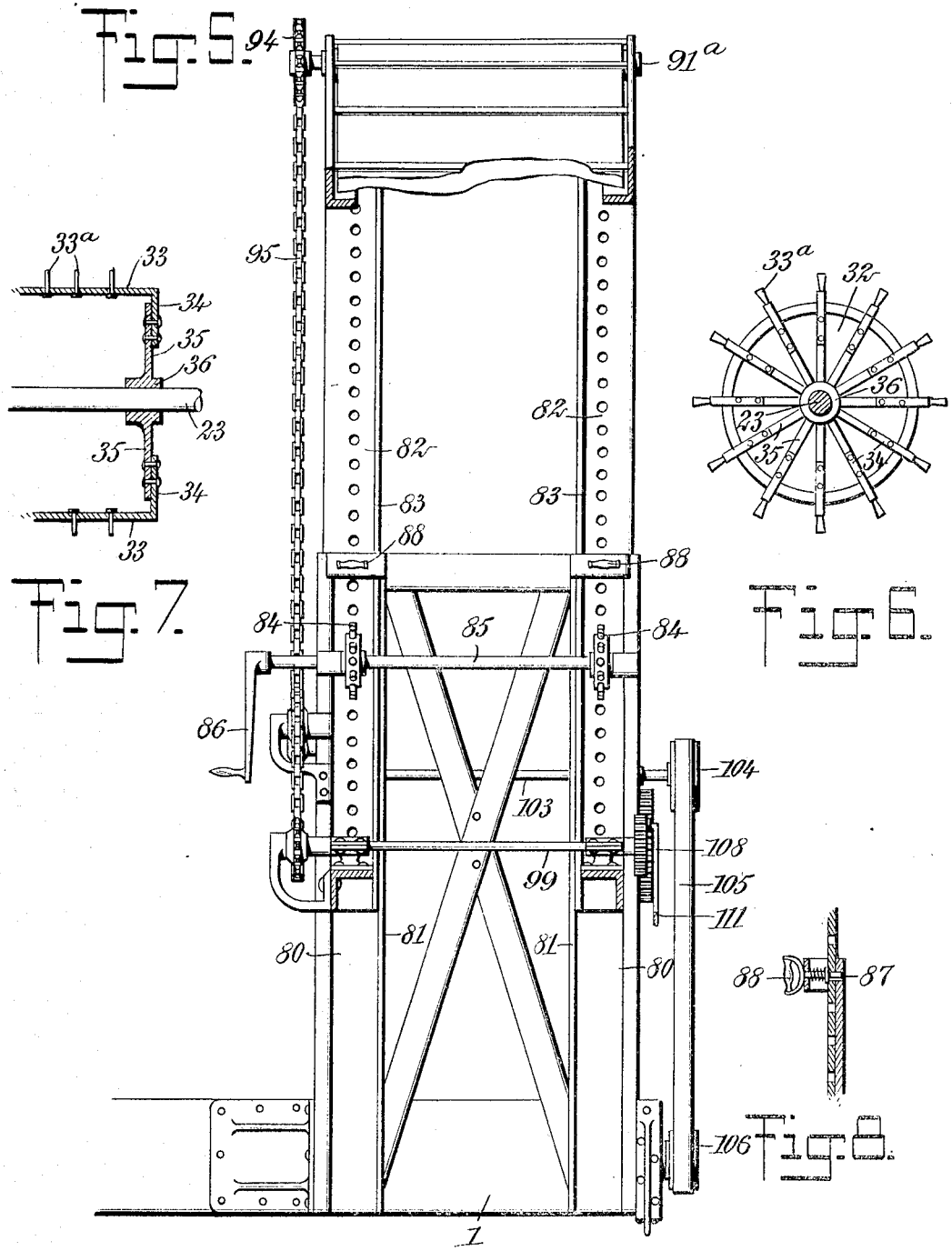
WITNESSES
INVENTOR
Thomas S. Haynes
BY Munn & Co
ATTORNEYS

UNITED STATES PATENT OFFICE.

THOMAS STANLEY HAYNES, OF BAY CITY, TEXAS.

THRESHING-MACHINE.

No. 887,632.   Specification of Letters Patent.   Patented May 12, 1908.

Application filed April 25, 1906. Serial No. 313,582.

*To all whom it may concern:*

Be it known that I, THOMAS STANLEY HAYNES, a citizen of the United States, and a resident of Bay City, in the county of Matagorda and State of Texas, have invented a new and Improved Threshing-Machine, of which the following is a full, clear, and exact description.

This invention is an improvement in threshing machines and has, among other objects, to provide a machine of this character that will be strong and comparatively light and will thresh the grain clean with facility and little waste.

The machine is especially adapted for the cutting and threshing of small grain, as rice and the like, and is so constructed and designed as to perform its functions satisfactorily when the grain is wet as well as when the grain is dry, as also to work well in marshy and water-covered fields, which is essential to a practical rice threshing machine.

The above objects are accomplished by my invention, one embodiment of which is hereinafter disclosed.

Reference is to be had to the accompanying drawings forming a part of this specification, in which similar characters of reference indicate corresponding parts in all the figures.

Figure 1 is a plan of my improved cutting and threshing machine, with the tongue by which the machine is drawn, broken away; Fig. 2 is a front end elevation of the machine with the front wheels and seat removed; Fig. 3 is a transverse sectional view on the line 3—3 of Fig. 1, looking in the direction of the arrow, with the reel and horizontal apron frame broken away; Fig. 4 is a longitudinal, sectional view on the line 4—4 of Fig. 1 through the cylinder and concave, looking in the direction of the arrow; Fig. 5 is an enlarged sectional elevation of the adjusting means for the elevator between the cutting and threshing mechanism, the section being on the line 5—5 of Fig. 2; Fig. 6 is an end view of the threshing cylinder; Fig. 7 is a fragmentary, longitudinal, central section of Fig. 6; and Fig. 8 is a fragmentary, sectional view showing a locking device for the elevator between the cutting and threshing mechanism.

The numeral 1 indicates a platform made up of a top floor 2 and bottom 3 separated by cross beams 4, substantially equally spaced, and end sills 5. The platform has an extension 6 at one side at the forward end, which is inclosed by a railing 7, leaving a suitable entrance opening, and is reinforced with the platform by an angular bracket 8.

At one side of the platform at the rear of the extension, a wheel for supporting the platform is journaled, having lugs on its periphery, and spokes inclosed at each side by sheet metal disks $8^a$ acting to keep out the mud and water. A wheel of identical construction is journaled slightly further forward at the opposite side of the platform. At the forward end of the platform is attached at each side thereof upwardly extending arms 9, connected by a cross bar $9^a$, said arms terminating in outwardly extending and downwardly curved and converging portions 10, forming a fork, having a horizontal extension $12^a$ to which a seat 11 is attached by means of a backwardly curved spring 12. The extension $12^a$ is coupled to an axle 13, by a pin 15, said axle carrying the forward wheels $13^a$ similar in construction to the rear wheels, for supporting this end of the platform, and has attached thereto a tongue 14 and side braces 16, carrying the usual hitching devices not shown.

Near the rear end and at one side of the floor 2 is mounted a gasolene engine or other suitable motor 17 having a driving shaft 18 journaled in standards 19 and a side standard 20, and carrying between the standard 20 and a standard 19 a pulley 21, see Fig. 1. The pulley 21 is connected to a driven pulley 22 fixed to a main driving shaft 23 by a belt 24. One end of the shaft 23 is journaled in a supporting standard 25 and the other end in a breast or concave 26, as appears in Fig. 3.

Near the pulley 22 a gear 27 is fixed to the shaft 23 which meshes with a smaller gear 28 acting to rapidly rotate a fan 30 in a casing 31 fixed to the floor of the machine. The shaft 23 has fixed to it to revolve in the breast or concave 26, a cylinder 32 made up of parallel metal strips 33 with downwardly bent ends 34 forming its periphery, said downwardly bent ends being riveted or otherwise secured to radiating arms 35 carried by hubs 36. Each strip 33 has projecting from it a series of equally spaced teeth $33^a$, the teeth of each series being in circumferential alinement and coöperating with a series of teeth $26^a$ projecting up from the concave 26. The construction of this cylinder is best shown in the detail views, Figs. 6 and 7. Fixed to the opposite end of the shaft 23 from the pulley 22 is a pulley 37, driving a pulley 38 by a belt 39, said pulley 38 being fixed to a shaft 40 having an offset portion 41 journaled to an inclined screen or riddle 42 at each side thereof, to give said screen a reciprocating motion. The screen 42 rests and reciprocates on flanged plates 42ª at each side of a hopper 43, said hopper having inclined sides passing into an opening 43ª at its bottom for a purpose hereinafter described. The concave 26 has an attached hopper 44 at the upper end and leaning to one side, as best shown in Fig. 3. This hopper is contracted at its lower end for directing the grain and husks to the longitudinal center of the cylinder 32.

At the rear of the concave 26 a chute is formed above the screen 42, which is inclosed by a cover plate 45 hinged at 46 extending the entire length of the screen and leading into a chute 47 directed to the ground at the rear of the platform. The arrangement of the flanged plates 42ª is such that the edges of the cover 45 are engaged with when the latter is seated in position.

A pipe 48 connects the fan casing 31 and passes upwardly into the front side of the hopper 43, where it has a flattened nozzle 49 directed toward the chute 47. The shaft 23 has fixed thereon between the fan and concave, a pulley 50 driving a pulley 51 fixed to a shaft 52 by means of a twisted belt 53. See Fig. 3. A sprocket wheel 54 is fixed to the shaft 52 near the hopper 43, and is connected to a sprocket wheel 55 on a shaft 56 by means of a chain 57. The shaft 56 is journaled in bearings at the upper end of an inclined elevator casing 58 passing through the floor 2 beneath the opening 43ª in the hopper 43. In the elevator casing an apron driven by chains 59 and 60 passing over sprocket wheels on the shafts 52 and 56, has fixed thereon at suitable intervals, transverse wooden strips 61 for keeping the grain, as the apron moves upwardly, from sliding back.

Just under the upper end of the elevator apron is a chute 62 downwardly inclined to a suitably supported and inclined hopper 63, said hopper having inclined sides terminating in a chute 64 leading to the extension 6. See Fig. 2. Diagonally and at the upper end of the hopper 63 a support 65 carries an upwardly projecting pin 66 on which is journaled a screen or riddle 67, having an upturned edge 68 and formed with a lip 69 at one corner, said lip projecting over a chute 70 leading into the concave above the cylinder as shown in Fig. 3. The corners of the screen 67 are slightly cut away to permit its oscillation about the pin 66 by a link 71 connecting the upturned edge of the screen at one end and eccentrically journaled in a disk 72 fixed to the shaft 56 at its opposite end. The inclination of the screen 67 is such that the corner in which the downwardly turned lip 69 is placed shall be the lowest point of its surface whereby such material as delivered on the screen which does not pass through it, will be worked into the chute 70.

Fixed to the rear end of the shaft 52 is a disk 73 connected to a sickle bar 74 by a crank 75 pivoted at one end of the sickle bar and eccentrically journaled in the disk at its opposite end. The sickle bar slides on a horizontal angular finger bar 76 having a parting blade or shoe 77 at the outer end and connected to the platform of the machine by an angular bar 78.

Secured to the floor of the platform at the outside of the concave 26 is a pair of triangular brackets 79, to the vertical faces of which are riveted or otherwise secured standards 80, said standards being flanged at the edges 81 and having the opposite edges bent over to form guide-ways for guide-bars 82 of the main apron frame. The guide-bars 82 are flanged on their opposite edges 83 to give a good bearing surface between them and the flanges 81. They also have a series of alining and equally spaced holes running their entire length, which act in the capacity of rack bars for engaging pin-wheels 84, the latter being fixed to a shaft 85 journaled on the standards 80 and adapted to be operated by a crank 86. At the upper end of each standard 80 a spring pin 87, operated by a handle 88, passes through a hole in the standard and one of the holes of the guide-bar 82 when the holes aline, for locking the guides in adjusted position.

The lower ends of the guide-bars 82 are secured to horizontal angle bars 89, which are connected intermediate their length to the upper ends of the guides by an angular frame or trough 90 at an inclination of about 45 degrees. At each end of the trough a roll 91 and 91ª is journaled, over which passes an apron 92, preferably made of a canvas strip 92ª with attached wooden strips 93 at intervals of its length to form an elevator to raise the unthreshed grain into the hopper 44. One of the journal bearings of the roll 91ª is extended at one side, to which a sprocket wheel 94 is fixed, driven by a chain 95 passing around a sprocket 96 on a shaft 97, then horizontally to and around a sprocket 98 on a shaft 99, then over an idly mounted sprocket 100 on a shaft 101, then down to and around a sprocket 102 on a shaft 103, then over around the sprocket 94. The shaft 103 is journaled in the upper end of the triangular brackets 79 and has fixed at the opposite side from the sprocket 102 a pulley 104 driven by a belt 105 passing around a pulley 106 at the forward end of the shaft 52.

The shaft 99 is journaled in bearings in the right angle of the apron frame and has fixed to its opposite side from the sprocket 98 a gear 107 meshing with a gear 108 journaled at the side thereof and connected to a sickle bar 109 slidable on a finger bar 110 fastened at the outside of the adjacent angle bar 89 by a rod 111 pivoted at one end of the sickle bar and at its opposite end eccentrically journaled in one side of the gear 108. At the outer ends of the angle bars 89 a roll 112 is journaled, over which passes a canvas strip 113 with attached transverse wooden strips 114 forming a horizontal apron passing over and driven by a roll 115 journaled in the angle bars 89, the journal at the rear side thereof being extended in order to carry the sprocket wheels 96 and 116. The sprocket wheel 116 drives a shaft 117 by a chain 118 passing about a sprocket 119, said shaft 117 being journaled in brackets fixed at the bottom side of the trough 90 and carrying a miter gear 120 at its front end meshing with a gear 121 fixed to a shaft 122 journaled in a bearing fixed to one side of the trough 90, and at its outer end in a standard 123 projecting upwardly at the end of the finger bar. Fixed to the shaft 122 just over the sickle bar is a reel made up of radial arms 124 attached to longitudinal strips 125 at their outer ends to coöperate with the sickle and finger bars in the usual manner as found in machines of this character. The angle bars 89 under the horizontal apron 113 are connected by a metal sheet forming a trough similar in all respects to the trough 90. The hopper 44 has fixed to one side thereof spring arms 126 lying close to the front and back faces of the hopper and normally forcing downward attached triangular guiding sheets 127, preferably made of canvas, the apices of said sheets being connected to the upper end of the adjacent elevator frame for the purpose of adapting them to the different positions of the frame adjustment. Forming a back for the triangular sheets is a strip of canvas or other flexible material 128 fixed to the hopper 44 and passing over a rod 129 with a weight 130 at its free end, as shown in Fig. 3. By this construction, on raising the elevator frame, the triangular guiding sheets and the canvas backing sheet will be automatically adjusted respectively by the spring arms 126 and the weight 130.

In the operation of the machine, the sickle is adjusted to suit the height of the grain to be cut, by drawing out the pins 87 by the handles 88 and rotating the crank 86 to elevate or depress the elevator frame and its attached mechanism. This adjustment may, however, be accomplished as the machine is driven forward and while all the parts are in motion. The gasolene engine or other motor 17 when started, revolves the main driving shaft 23 and other shafts receiving their power therefrom. This revolves the shaft 122 and its attached reel and reciprocates the sickle bar 109 which cuts off the grain, as the machine moves forward and throws it, by the aid of the reel, on the apron 113. This apron transports the grain and straw cut to the inclined apron 92, which empties it into the hopper 44, leading to the breast or concave 26, where it is threshed by the rapidly revolving cylinder 32 and discharged over the gyrating screen 42, the latter permitting the grain to fall through but arresting the main portion of the husks and straw and working them out through the chute 47. The finer portion of the husks and straw which pass through the screen 42 will, to a considerable extent, be blown by the air blast from the nozzle 49 out through the chute 47. The grain falling into the hopper 43 will pass out through the opening 43ª in its bottom to the elevator 58, which will lift it to the chute 62 and discharge it on the oscillating screen 67, the latter permitting the completely threshed grain to drop through into the hopper 63 and pass down through the chute 64 to any suitable receptacle, usually a bag held by the operator standing on the extension 6. The grain which is not completely threshed, together with such bits of straw and chaff as pass the screen 42 and the air blast 49, will pass over the lip 69 into the chute 70, which conducts it back to the concave 28 where it will repass through the threshing operation.

It should be noted that the rear sickle bar 74 is positioned near the ground to cut the stubble after the front sickle has passed over the growing grain and removed it from the straw.

The gearing between all the driven parts is of such size as to make them work in proper sequence and give the most advantageous results in the operation of the machine as a whole.

Having thus described my invention I claim as new and desire to secure by Letters Patent:

1. In a threshing machine, a breast or concave, a threshing cylinder revolubly mounted therein, a chute leading from the breast or concave, a hopper forming a portion of the under side of the chute, a screen over the hopper, a second screen arranged at one side of the chute, an elevator leading from the hopper to the second screen, and means for reciprocating said screen.

2. In a threshing machine, a breast or concave, a threshing cylinder revolubly mounted therein, a chute leading from the breast or concave, a hopper at the bottom of the chute, a screen over the hopper, a second screen revolubly supported and arranged at one side of the hopper, an elevator leading from the hopper and discharging on the second screen, means for reciprocating the first screen, means for driving the elevator, and means for oscillating the second screen directly from the elevator driving means.

3. In a threshing machine, a breast or concave, a cylinder revolubly mounted therein, a downwardly-inclined screen leading from the breast or concave, a hopper under the screen, a second screen arranged at one side of the hopper, an elevator leading from the hopper and discharging on said second screen, and means for oscillating the screens.

4. In a threshing machine, a breast or concave, a hopper leading to the same, an adjustable elevator at one side of the hopper, flexible side pieces and a bottom piece connecting the hopper with the elevator, and means for automatically adjusting said flexible pieces when the elevator is raised or lowered.

5. In a threshing machine, a breast or concave, a hopper leading to the same, an adjustable elevator at one side of the hopper, canvas side pieces and a canvas bottom piece connecting the hopper with the elevator, and independent means for automatically adjusting said side pieces and bottom piece when the elevator is raised or lowered.

6. In a threshing machine, a breast or concave, a hopper leading to the same, an adjustable elevator at one side of the hopper, triangular canvas side pieces at each side of the hopper connecting the hopper with the elevator, a canvas bottom for said side pieces connected to the hopper and to the elevator, spring arms for adjusting the side pieces, and a weight for adjusting the bottom.

7. In a threshing machine, a breast or concave having a hopper arranged thereover, threshing means revolubly mounted in the breast or concave, an elevator discharging into said hopper, a screen leading from the breast or concave, a hopper under the screen, a cover over the screen, a third hopper, an elevator leading from the hopper under the screen to said third hopper, a screen over the third hopper, a chute leading from said third hopper to said first-named hopper, and means for reciprocating the screen.

8. In a threshing machine, a breast or concave having a hopper arranged thereover, a cylinder revolubly mounted in the breast or concave, a downwardly-inclined screen leading from the breast or concave, a removable cover over said screen, a second hopper under the screen, a third hopper having a discharge chute, a screen over the third hopper, an elevator leading from the second hopper to the third hopper, and a chute leading from the screen over the third hopper to the first hopper.

9. In a threshing machine, a breast or concave, a cylinder revolubly mounted therein, a chute downwardly inclined from the breast or concave, a hopper under the chute, a screen over the hopper, a second screen arranged at one side of the chute, an elevator leading from the hopper to the second screen, and an air blast directed under the first screen out of the chute and over the hopper.

10. In a threshing machine, a platform mounted on wheels, a breast or concave mounted on the platform, a threshing cylinder revolubly mounted in the concave, a hopper arranged over said cylinder, an elevator leading to the hopper, a chute leading from the breast or concave to the rear of the platform, a second hopper arranged under said chute intermediate its length and communicating therewith, a screen over said second hopper, a second screen, an elevator leading from the second hopper and discharging on said second screen, a third hopper having a discharge chute arranged under said second screen, and a chute leading from said second screen and discharging into the first hopper.

11. In a threshing machine, threshing means, screening means receiving the threshed grain from the threshing means, rescreening means for receiving the grain from the screening means, said rescreening means comprising a revolubly-mounted inclined screen, means for oscillating said screen, and means arranged at the lower end of said screen connecting with the threshing means for passing the unthreshed grain back to the threshing means.

12. In a threshing machine, a platform, a breast or concave mounted on the platform, a cylinder revolubly mounted in the concave, a chute leading from the concave to the rear end of the platform, a hopper arranged under a portion of said chute, a screen over said hopper, an elevator passing beneath the platform below said hopper for receiving the grain therefrom, an inclined screen on which said elevator discharges, and a chute leading from the lower end of said inclined screen and connecting with the concave, for the purpose described.

13. In a threshing machine, a platform having an extension at one side thereof, threshing means supported on said platform, a chute leading from the threshing means to the rear of the platform, a hopper arranged under the chute, a second hopper supported on the platform above the first hopper, a chute leading from the second hopper over the platform extension, an inclined screen arranged over said second hopper, an elevator leading from the first hopper and discharging on said inclined screen, and means for oscillating said screen.

14. In a threshing machine, means for threshing the grain, means for screening the grain, rescreening means for the grain, comprising a revolubly-mounted inclined screen having a lip at the lower side thereof, a chute arranged under said lip and connecting with the threshing means, an elevator leading from the screening means and discharging on said rescreening means, and means for oscillating said inclined screen.

15. In a threshing machine, means for threshing the grain, screening means for receiving the grain from the threshing means, rescreening means comprising a revolubly-mounted inclined screen, an elevator leading from the screening means and discharging upon said inclined screen, means for operating the elevator, and means for oscillating said inclined screen directly from said operating means.

16. In a threshing machine, a platform, a breast or concave mounted on the platform, a driving shaft having a threshing cylinder fixed thereto revolubly mounted in the breast or concave, a chute leading from the breast or concave, a hopper under said chute, a screen over said hopper, a fan driven from said driving shaft, a nozzle connected with said fan and projecting into said chute, and a motor mounted on said platform for driving said driving shaft.

In testimony whereof I have signed my name to this specification in the presence of two subscribing witnesses.

THOMAS STANLEY HAYNES.

Witnesses:
J. W. MAGILL,
JNO. W. GAINES.